J. SAUDEK.
DEVICE FOR COMBINING MOTION ACTS AND MOVING PICTURES.
APPLICATION FILED JAN. 19, 1910.
1,099,207.
Patented June 9, 1914.
2 SHEETS—SHEET 1.
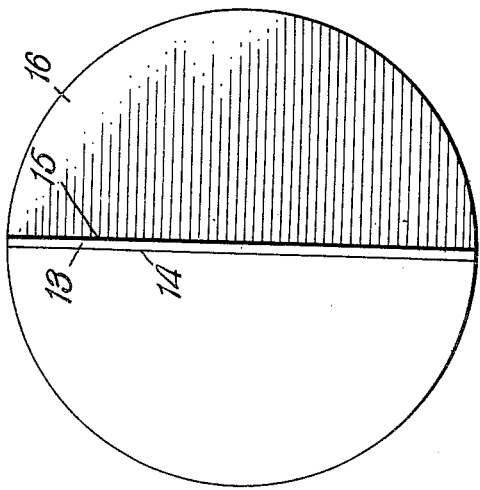
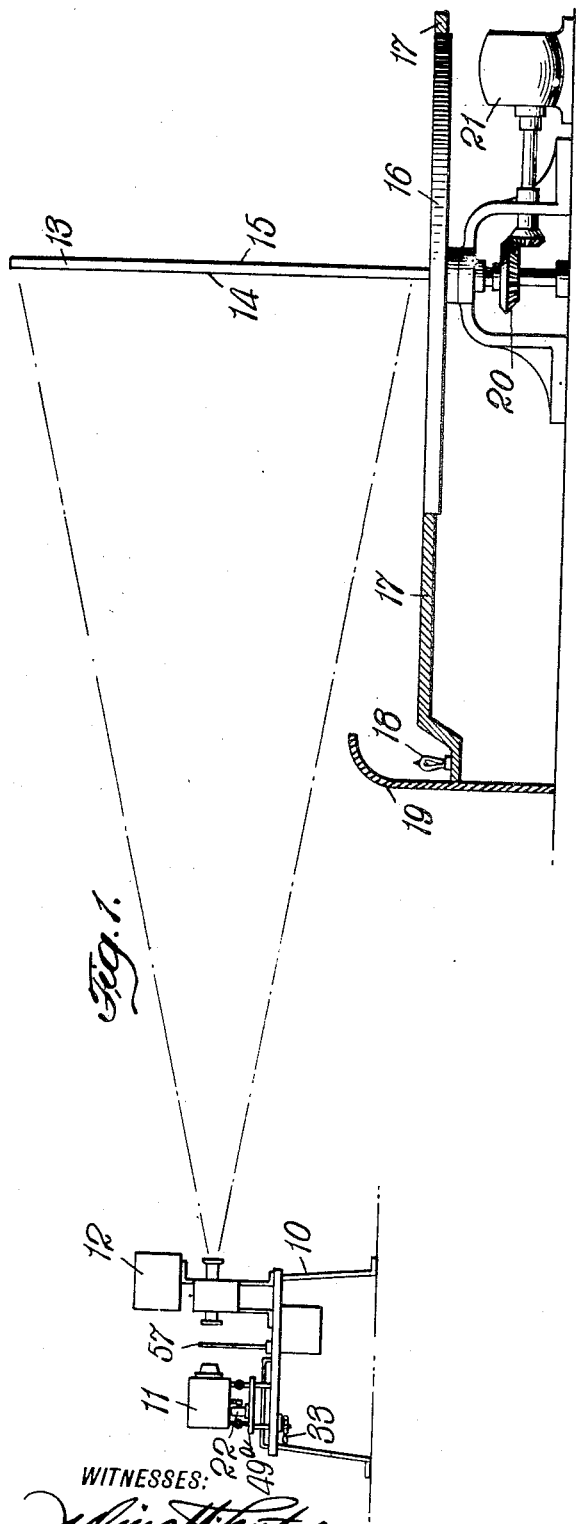
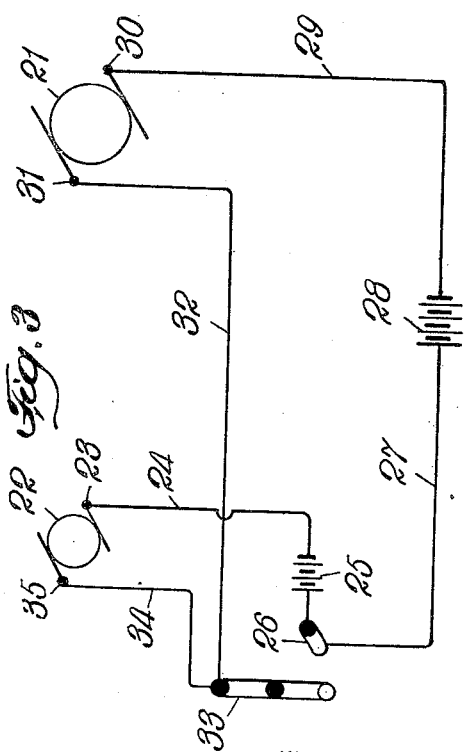
INVENTOR
Jacob Saudek
BY
H. T. Criswell
ATTORNEY
WITNESSES:

J. SAUDEK.
DEVICE FOR COMBINING MOTION ACTS AND MOVING PICTURES.
APPLICATION FILED JAN. 19, 1910.
1,099,207.
Patented June 9, 1914.
2 SHEETS—SHEET 2.
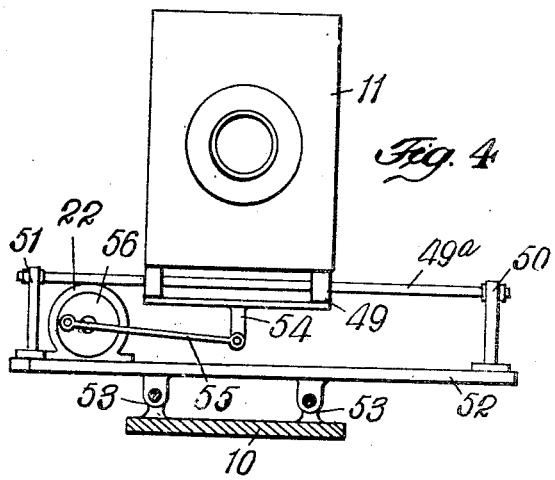
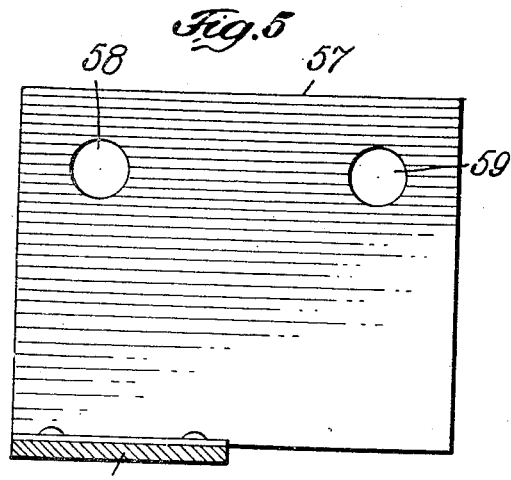
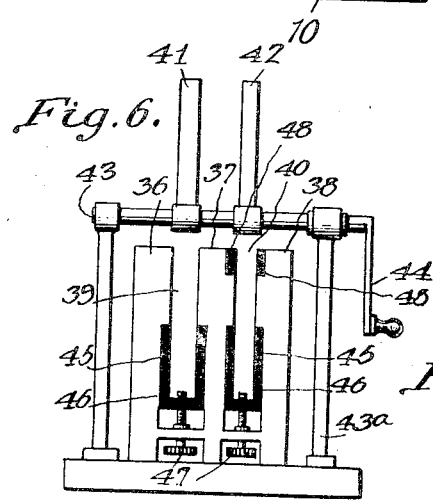
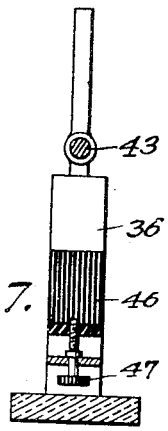
WITNESSES:
INVENTOR
Jacob Saudek
BY
H. T. Criswell
ATTORNEY

UNITED STATES PATENT OFFICE.

JACOB SAUDEK, OF NEW YORK, N. Y.

DEVICE FOR COMBINING MOTION ACTS AND MOVING PICTURES.

1,099,207.   Specification of Letters Patent.   Patented June 9, 1914.

Application filed January 19, 1910. Serial No. 538,863.

*To all whom it may concern:*

Be it known that I, JACOB SAUDEK, a citizen of the United States, and resident of New York, county and State of New York, have invented certain new and useful Improvements in Devices for Combining Motion Acts and Moving Pictures, of which the following is a full, clear, and exact description.

This invention relates more particularly to means for producing novel and mystifying exhibitions by the physical motions of a person or a number of persons in combination with moving picture apparatus and a spot-light, intended for the amusement of the public, the motions of the individual or individuals having been portrayed upon the moving picture film, and following a predetermined time after cessation of the living impersonations before the audience the moving picture apparatus instantly reproduces in succession thereto the impersonations previously portrayed upon said film.

The primary object of the invention is to provide a device for combining motion acts and moving pictures whereby a person or a number of persons present impersonations upon a dark curtained platform or stage partly lighted to give a spot-light effect and the whole or parts of the impersonations are portrayed upon the moving picture film.

Another object of said invention is to provide means whereby semblances of the living individuals, or objects, may be used to enact parts of the impersonations for portrayal on the films for the purpose of reproducing mysterious, interesting and amusing exhibitions including pantomime, equestrian, acrobatic, juggling, living pictures, physical culture, contortion, dancing, lightning changes, views, scenery, illusionary and other motion acts, and a further object of the invention is to provide a method wherein the living impersonations are first rendered to the audience at exhibitions thereof and made to appear as the principal participants throughout the various pictures reproduced by the picture apparatus, and at the finale of the exhibition relief to the mystery of the scenes is given to the audience by the reappearance in person of the living impersonators.

My invention further consists in providing a rotatable platform operated by electric motive power substantially simultaneous with alternate operations of a moving picture apparatus and a spot-light, the said motive power being under the control of a single operator, and also in providing means whereby the rotatable platform may be manually operated practically simultaneous with alternate manual operating of the moving picture apparatus and spot-light following signals to each other by the separate operators.

A further object of the invention is to provide means for producing one or more revolutions or only part of one revolution of the platform, and to provide means for instantly changing the positions of the lamp or spot-light or the moving picture apparatus to correspond with certain positions of the screen or of the platform after being rotated.

In the invention I also employ dark and white curtains or screens alternately, the former being adapted for use in connection with the operation of the spot-light during the performances of the living impersonators, and the latter being adapted for displaying thereon the pictures from the moving picture apparatus, and said curtain or screens may be connected to and rotated simultaneously with the rotatable platform, or in the invention I may employ efficient means for alternate use of the dark and the white curtains or screens independent of a rotatable platform.

Furthermore, my invention consists in providing a simple and efficient device for varying the transmission of the electric power operating the means for rotating the rotatable platform and the means for positioning the lamp or spot-light or the moving picture apparatus.

A practical embodiment of the invention is represented in the accompanying drawings forming a part of this specification in which similar characters of reference indicate corresponding parts in all the views, the said invention being more fully described hereinafter and then pointed out in the appended claims.

In the drawings Figure 1, is a side view of my improved apparatus for producing physical motion acts and moving pictures in combination according to my improved method. Fig. 2 is a plan view of the platform used in connection therewith. Fig. 3 is a diagrammatic view of the electric connections. Fig. 4 is a detail front view of the guiding means for the spot light. Fig.

5 shows a screen used in connection with my improved apparatus. Fig. 6 is a side elevation of my improved switch used in connection with the apparatus, and Fig. 7 is a vertical longitudinal cross-section through the same.

Arranged in any convenient manner upon a table or suitable support 10 is a movable spot-light or lamp 11 and a moving picture apparatus 12 of any preferred construction and type adapted to throw a light upon a stage curtain, 13, one side of which is white, as at 14, and the other side black, as indicated at 15. The curtain 13 may be mounted in any well known manner upon a revoluble platform provided in the rear or background of a stage 17 having the usual foot-lights 18 and guard 19 in front thereof.

The platform 16 is adapted to be revolved 180 degrees by means of a bevel-gear 20 of any required diameter for turning the platform at a speed in proportion to the motion of the spot-light or lamp when in or out of action. The bevel gear 20 may be rotated by a motor 21 of any desired form whereby the platform 16 will be revolved with sufficient momentum so as to make one revolution or a part of a revolution, but said motor may also be omitted and the platform actuated by hand or other manually operated means, as occasion requires, without deviating from the spirit and scope of the present invention.

Fig. 3 shows a diagrammatic view of an electric circuit in which is provided a motor, as 22, for moving the spot-light or lamp 11 besides the motor 21 for revolving the stage platform 16, and both of said motors are regulated for operating simultaneously and at proportionate speeds the spot-light and the stage platform. One terminal, as 23, of the motor 22 is connected by a wire 24 to one pole of a source of electricity 25, and the other pole of which is connected to a switch 26, and said switch is connected by a wire 27 to one pole of a second source of electricity 28, the other pole of which being connected by a wire 29 to the terminal 30 of the stage motor 21. The other terminal of the stage motor 21 is in turn connected by a wire 32 to a switch 33, and said switch is connected by a wire 34 to the second terminal 35 of the motor 22 for the spot-light or lamp 11. Thus when the switch 33 is closed a current of electricity will be generated for energizing the motor 22 to move the spot-light or lamp 11 simultaneously with the energizing of the motor 21 for revolving the stage platform 16.

In order to control the current of electricity whereby the speed and momentum of the motors 21 and 22 may be controlled so as to move the spot-light 11 and revolve the platform 16 in desired proportions and at any preferred intervals, the switch 33, as shown in Fig. 6, consists of conductors 36, 37, and 38 which are spaced apart so as to provide spaces 39 and 40 therebetween for reception of tongues or strips, as 41 and 42, which serve as the circuit closing means. The tongues or strips 41 and 42 are arranged upon a shaft 43 journaled in the bearings of a frame 43ª, and said shaft is rotated by a crank handle 44 which may be turned by the hand or in any other desired manner. Within the spaces 39 and 40 respectively and movably held upon the opposed edges of the metal conductors 36, 37 and 38, are adjustable sleeves or linings 45 which are made of insulating material 46 of any suitable length. Each of the insulating sleeves 45 are bridged at one end, and has a threaded opening therethrough for reception of a thumb screw, as 47, adapted to adjust the sleeve at a suitable point upon the conductors. Within the space 40 and upon the opposed edges of the conductors 37 and 38 are also provided a lining 48 of insulating material. When the handle 44 is rotated from left to right the tongues or strips 41 and 42 are passed through the spaces 39 and 40. The insulating sleeves 45 may be the same in length, or of different lengths, whereby the switch may close the circuits for operating the stage motor 21 and the motor 22 at consecutive intervals. For instance, by properly adjusting the insulating sleeves 45 upon the conductors 36 and 37 the tongue or strip 41 will contact first with said conductors to close the circuit for operating the stage motor 21 so as to revolve the platform 16 one-half a revolution before the spot-light is moved, and also allowing for the momentum of said platform as well as the variations of loads from the persons thereupon during different acts. By properly adjusting the insulating sleeves 45 and the linings 48 upon the conductors 37 and 38 the tongue or strip 42 will subsequently contact at a predetermined time with the conductors 37 and 38 for closing the circuit to operate the motor 22 the required interval for shifting the lamp or spot-light a sufficient distance so that the light thereof will be projected upon the stage and the curtain.

In Fig. 4 the spot-light or lamp 11 is shown as being provided with a frame 49 whereby said spot-light may be slidable upon a guide-rail 49ª which is disposed between standards 50 and 51 held upon a support 52 pivotally connected to trunnions 53 provided upon the table 10 so as to allow a limited adjustment of the spot-light in a horizontal direction. In order to shift the spot-light or lamp 11 upon the guard rail 49ª the required distance, a link 54 is formed upon the frame 49, and to said link is pivoted one end of a rod 55 having its opposite end pivotally held to a crank disk 56 which is rotated by the motor 22. The spot-light 11 is adapted to be used alternately in conjunction with the picture apparatus 12 for producing pictures upon the white side 14 of the stage curtain 13 and for projecting a light upon the performer or performers when rendering motion acts before the black side 15 of said stage curtain. In front of the spot-light 11 and arranged so as to be either movable or stationary upon the table 10 is a screen 57, which is illustrated upon an enlarged scale in Fig. 5 of the drawing. In the screen 57 are openings 58 and 59, through one of which the light from the lamp 11 is thrown upon the performers before the black side of the stage curtain and through the other of said openings the light from the lamp 11 when shifted by the action of the motor 22 is employed for projecting the pictures upon the white side of the stage curtain by means of the picture apparatus 12.

In operating my apparatus the light from the lamp 11 is first thrown upon the black side 15 of the stage curtain 13 of the movable platform 17 when the performer or performers thereon render their impersonations or motion acts, and who may disappear at the end of the act imperceptibly to the side of the stage, or by operating the switch 33 the current of electricity thereby generated will energize the motor 21 for revolving the stage platform 16 one-half of a revolution together with the performers thereon, as well as bringing the white side of the curtain 13 to view. The electric current instantly operates the means for also moving the lamp 11 in alinement with the moving picture apparatus 12 whereby the moving pictures are projected from films having previously been made from the identical performers in the performance of freak acts or other interesting or amusing scenes. Thus it is clear that the change from the impersonations of the living performers to the display of the moving pictures is so quickly executed that the public will be deceived and not be aware of the disappearance of the living actors thereby affording much amusement and creating a great deal of mystery concerning the entire performance. The spot-light or lamp may also be operated manually as may also be the stage platform, but in such a case a number of previously arranged signals must be given from the operator of the lights to the stage operator so as to effect a simultaneous change of lights and curtains to produce the desired effect and create the impression of an uninterrupted performance.

Changes may be made in the shape and proportions of the parts and operating elements of my improved apparatus without departing from the scope of the present invention as described and laid down in the claims, therefore, I do not wish to be limited to the particular form of apparatus and arrangement of the parts thereof as herein described and shown.

Having thus described my invention, I claim as new and desire to secure by Letters Patent:

1. An apparatus of the character described, comprising a spot-light, a moving picture apparatus, a common support for both, a curtain upon which the lights of said spot-light and moving picture apparatus are adapted to be projected, said curtain having a black and a white side, and means for revolving the curtain so as to present, as occasion requires, its black or white side to the public, substantially as described and for the purpose set forth.

2. An apparatus of the character described, comprising an adjustable spot-light, a stationary moving picture apparatus, a common support for both, a curtain upon which the lights of said spot-light and moving picture apparatus are adapted to be projected, said curtain having a black and a white side, a platform on the rear of a stage carrying said curtain, and means to revolve said platform and curtain so as to present its black side to the light of the spot-light and its white side to the moving picture apparatus, substantially as described and for the purpose set forth.

3. An apparatus of the character described, comprising a spot-light, electrically actuated means for adjusting the spot-light in a horizontal direction and for simultaneously operating a platform on the rear of a stage at a predetermined speed, a curtain upon said platform, said curtain having a black side and a white side, its black side being before the spot-light, and adapted to follow the revolution of said platform for 180 degrees so as to present its white side to a moving picture apparatus when simultaneously brought into action, substantially as described and for the purpose set forth.

4. An apparatus of the character described, comprising a spot-light, a moving picture apparatus, a screen having two openings through which the spot-light and pictures from the moving picture apparatus may alternately be projected, a curtain having a black and a white side and a revoluble platform carrying the curtain, said platform being adapted to be revolved for alternately presenting the black side of said curtain to the lamp and its white side to the moving picture apparatus, substantially as described.

5. An apparatus of the character described, comprising an adjustable spot-light, a moving picture apparatus, a motor for adjusting said spot-light, a platform having a curtain mounted thereon, a motor adapted to revolve said platform, an electric circuit, a switch for closing the circuit for energizing the motor for the spot-light and the motor for said platform for the purpose of giving the spot-light and the platform a uniform speed at predetermined intervals, substantially as described and for the purpose set forth.

6. An apparatus of the character described, comprising a curtain having black and white sides, a spot-light, a moving picture apparatus, a revoluble platform supporting the curtain, and means for simultaneously actuating said spot-light and the platform at a predetermined ratio of speed and at predetermined proportionate intervals so as to present the black side of said curtain to the spot-light and its white side to the moving picture apparatus, substantially as described.

7. In an apparatus of the character described, a spot-light, a frame carrying said spot-light and adjustably mounted upon a guide-rail, standards supporting said guide-rail and also mounted upon a support, a motor, a crank disk provided upon the motor, and a rod connecting said crank disk to a link of the frame of the spot-light for the purpose of transferring the motion of said motor to the spot-light, substantially as described.

8. An apparatus of the character described, comprising an adjustable spot-light, a moving picture apparatus, a motor for adjusting said spot-light, a revoluble curtain, a motor for revolving said curtain, an electric circuit, and means adapted to close the electric circuit for energizing the motor for the spot-light and the motor for the curtain for the purpose of giving the spot-light and the curtain a uniform speed at predetermined intervals, substantially as described and for the purpose set forth.

9. An apparatus of the character described, comprising a revoluble curtain having black and white sides, means adapted to revolve the curtain, a spot-light, means adapted to shift the spot-light, a moving picture apparatus, an electric circuit, and a switch adapted to close the electric circuit for operating the means to revolve the curtain and simultaneously operate the means for shifting the spot-light whereby the black side of the curtain will be before the spot-light and the white side of said curtain will alternately be before the moving picture apparatus, substantially as described.

10. An apparatus of the character described, comprising a revoluble curtain having black and white sides, means adapted to revolve the curtain, a motor adapted to revolve the means for revolving the curtain, a spot-light, means adapted to shift the spot-light, a moving picture apparatus, an electric circuit, and means adapted to close the electric circuit for energizing the motor to revolve the curtain and simultaneously operate the means for shifting the spot-light whereby the black side of the curtain will be before the spot-light and the white side of said curtain will alternately be before the moving picture apparatus, substantially as described.

This specification signed and witnessed this 18 day of January A. D. 1910.

JACOB SAUDEK.

Witnesses:
OTTO A. GILLIG,
G. WHYAID.